United States Patent [19]

Posse et al.

[11] 4,432,747
[45] Feb. 21, 1984

[54] CENTRIFUGAL SEPARATOR CONTROL

[75] Inventors: Günther Posse, Bergisch Gladbach; Horst Jacob, Cologne, both of Fed. Rep. of Germany

[73] Assignee: Klöckner-Humboldt-Deutz AG, Fed. Rep. of Germany

[21] Appl. No.: 361,413

[22] Filed: Mar. 24, 1982

[30] Foreign Application Priority Data

Apr. 18, 1981 [DE] Fed. Rep. of Germany ....... 3115692

[51] Int. Cl.$^3$ .............................................. B04B 9/02
[52] U.S. Cl. ............................................. 494/8; 494/9; 494/53
[58] Field of Search ..................... 494/7, 8, 9, 52, 53

[56] References Cited

U.S. PATENT DOCUMENTS 4,141,488  2/1979  Gense ....................................... 494/9
4,240,578 12/1980  Jackson ................................... 494/8
4,299,353 11/1981  Bruning et al. ..................... 494/53 X
4,303,192 12/1981  Katsume ........................... 494/53 X Primary Examiner—Philip R. Coe
Assistant Examiner—Thomas W. Epting
Attorney, Agent, or Firm—Hill, Van Santen, Steadman & Simpson

[57] ABSTRACT

A method and mechanism for controlling the operation of a centrifugal separator having a relatively rotating drum and screw conveyor whereby the speed of each is measured and the torque for driving the screw is measured and the speed differential control is in a predetermined functional relationship to the torque and at a particular maximum and minimum value of torque, the speed differential being changed independently of torque and when a predetermined change in torque is obtained, the predetermined functional relationship between the torque and speed differential being changed to a different characteristic step-wise with the characteristic or relationship being shifted step-wise.

14 Claims, 2 Drawing Figures

CENTRIFUGAL SEPARATOR CONTROL

BACKGROUND OF THE INVENTION

The invention relates to a method and apparatus for controlling the differential speed between rotating structural parts such as a centrifuge drum and a screw conveyor wherein the screw driving torque and the differential speed between the drum and screw conveyor are measured and are controlled as a relationship of each other according to a predetermined characteristic programmed into a computer. The characteristic is changed to a new characteristic in a unique manner.

Screw centrifuges of the type referred to are used for the separation of solids liquids mixtures into their solids and liquids components. In the structure used, a screw conveyor rotates within a rotatable cylindrical conical drum. The solids are deposited against the inner surface of the wall of the drum as a result of the centrifugal force and the solids are conveyed toward a solids discharge from the drum by means of a screw conveyor which is operated at a differential speed relative to the rotating drum. The solids discharge is located in the conical end of the drum, and the material to be separated is supplied to the opposite end.

With a given amount of mixture containing solids, a specific conveying rate is employed. The solids load on the drum requires a specific differential speed between the screw conveyor and the drum, and the driving torque for driving the screw also has a specific value.

It is usually an objective to obtain a low differential speed between the drum and screw so that as long as possible a dwell time of the mixture occurs within the drum to obtain optimum separation of the liquid component from the solids. However, due to fluctuations in the properties of the input mixture, there is a danger of closing, stopping or clogging the unit when the conveying rate remains constant when the mixture encounters an increasing solids content. In this case, an increased solids load on the centrifuge occurs which results in a rapidly rising screw torque. Due to an overload of the screw drive, this can lead to a complete standstill or clogging of the unit. In addition to fluctuations in the solid content, other fluctuations in other parameters can occur which influence the settling behavior of the solids and these must be compensated for in the operation of the separator.

One method for the control of the differential speed between a centrifuge drum and a screw conveyor rotating therein is disclosed in German Patent Application No. P 30 05 658.7 and U.S. application, Ser. No. 234,382, filed Feb. 13, 1981, the disclosure of which is incorporated herein by reference. In that application, the speeds of the elements are measured free of contact, and an actual value of differential speed is determined by means of a computer. At the same time the torque for driving the shaft of the screw conveyor is measured, and a value for the differential speed is formulated from this measured value of torque in accordance with a predetermined functional relationship or characteristic which is stored in the computer and which is particularly specifically related to the nature of the slurry. A controlled variable which influences the speed of the drive of the screw conveyor is derived from the repetitive error which is derived between the actual and rated values determined in this manner. This prior method makes it possible for an operation of the screw centrifuge in such a manner that the operating point determined from the measured values for the screw torque and the differential speed is automatically held to the prescribed characteristic in a coordinate system defined by the measured values. In that case where the system has reached the maximum possible differential speed, i.e., has been levelled, a computer controlled throttling or shutdown of the feed of the solids liquids mixture is provided.

An object of the present invention is to provide a method for controlling the differential speed in rotary centrifuges which renders possible an automatic operation and is particularly advantageous in obtaining flexibility with fluctuations in parameters relating to the solids liquids mixture. This object is achieved in that the position of the functional relationship or characteristic between the speed differential and torque is changed step by step in a coordinate system by means of a computer with upward or downward change of values beyond a predetermined limit.

In a simple case the functional relationship or the characteristic between speed differential and torque is a straight-line relationship in a coordinate system with the differential speed being plotted on the abscissa and the screw torque being plotted on the ordinate. Along the plot or curve representing the functional relationship or characteristic, there are end points or maximum values of speed and torque. These limiting or maximum values of the characteristic are functionally allocated to a specific slurry consistency. With change in slurry consistency, the characteristic is automatically changed in a unique manner. What is expediently strived for is a mean position of the operating point in an area of the characteristic which renders fluctuations within specific band widths or ranges in both directions without limiting the values of the characteristic being reach. Within the range or limits prescribed by the structural features of the screw drive, the present invention renders possible a computer controlled change to a new characteristic corresponding to an altered slurry consistency with said new characteristic being used as the basis for control with the new slurry. This new characteristic or relationship will guarantee stable operating conditions with respect to the working range of the centrifuge. Of course, other parameters derived from measurable properties of the solids liquid mixture supplied to the centrifuge can be used as parameters for choosing the characteristic.

In accordance with the principles of the invention, the differential speed is controlled in accordance with the characteristic determined from a measurement of the screw torque. In comparison with the method referred to above in Patent Application No. P 30 05 658.7, the range in which the rated value for the differential speed can fluctuate is expanded by the totality of possible characteristics which can be set by the computer. By so doing a control method is created which adapts itself to variations and fluctuations, and is capable of handling broad fluctuations of parameters of the solid liquid mixture to be treated in the centrifuge.

In further accordance with the features of the invention, when the upper limiting value of any one characteristic is reached, the maximum value of the differential speed is adjusted until the screw torque has dropped below a predetermined value before a new characteristic is set. This is achieved by a measure that when a disruption occurs, a new characteristic or a new stationary operating condition occurs in the shortest possible time. By this arrangement, the maximum possible differential speed is expediently retained until the solids load of the centrifuge has been reduced to a proper operating condition and regular operation is possible in accord with the new characteristic which has now been set.

When the machine operates and the load on the machine increases due to change in rate of feed or consistency of the liquids solids mixture, and the upper limiting value of a given characteristic is reached, the differential speed is increased step by step. For each step, the change of the screw torque is measured with each step and a further increase in differential speed results if there has not been a change in screw torque sufficient to cause a change to a new characteristic. Thus, during a specific time interval after each increased step, the change of the measured value for the screw torque is observed and a further increase of the differential speed is obtained until the screw torque drops to a predetermined value whereupon the mechanism shifts to a new characteristic or a new relationship between torque and speed differential. These objectives can be obtained in terms of the technology of the apparatus used, by using a differential quotient generator which supplies a measured value for the change in output signal of the screw torque and this causes a further increase in the differential speed.

Another object of the invention is to provide an improved control mechanism which automatically selects a curve characteristic of relationship between torque and speed differential in a step-wise fashion with a mechanism and method operating in a rapid manner when a maximum or minimum value for each given characteristic is obtained.

Other objects, advantages and features will become more apparent with the teaching of the principles of the invention in connection with the disclosure of the preferred embodiments thereof in the specification, claims and drawings, in which:

DESCRIPTION OF THE PREFERRED EMBODIMENTS

Figure 1:
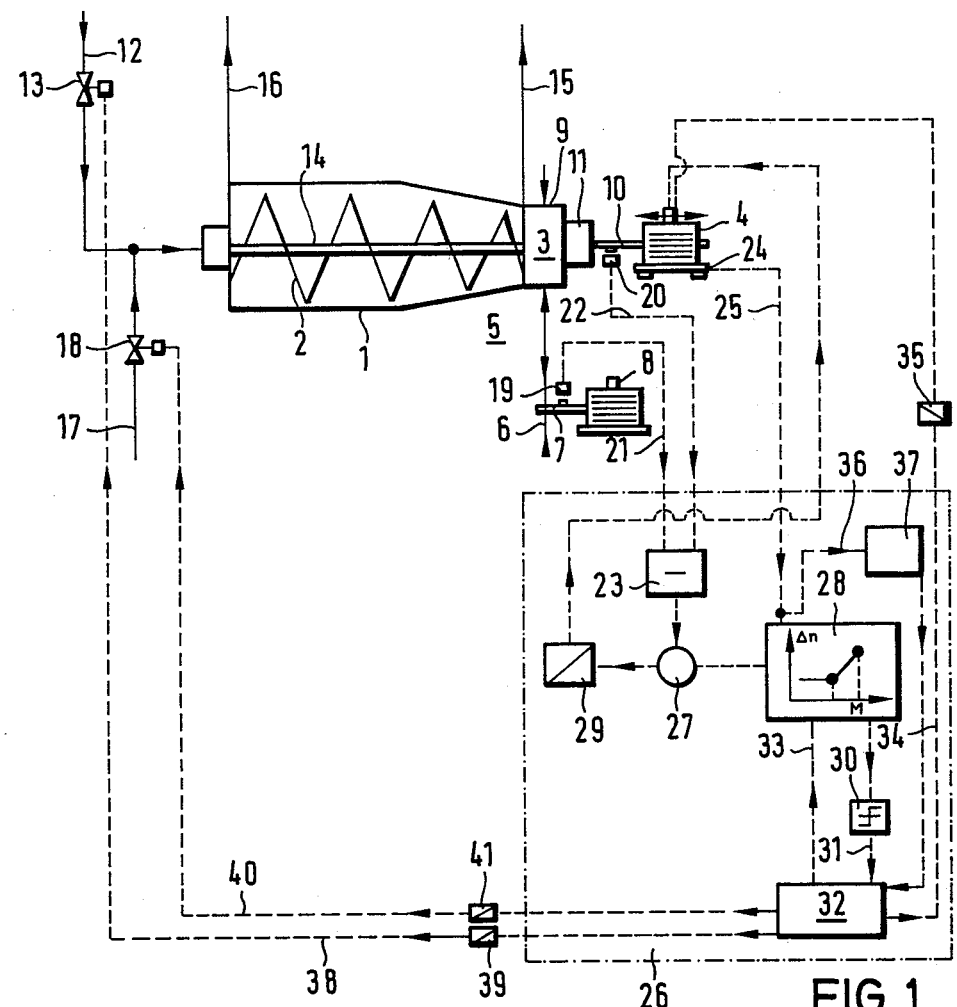
FIG. 1 is a diagrammatic view of a centrifuge separator and control mechanism therefor constructed and operating in accordance with the principles of the present invention.

FIG. 1 shows a centrifuge separator with a rotatably driven drum 1. Within the drum is a rotatably driven screw conveyor 2. In accordance with the principles of this invention, it is not significant whether the screw conveyor precedes or trails relative to the rotation of the centrifuge drum, and the speed differential will be a reflection of the difference in speed of rotation. The screw conveyor is connected to a variable speed drive 4, and the drum and conveyor are interconnected by a gearing 3 having a housing which rotates with the centrifugal drum 1.

The drive of the centrifugal drum 1 occurs with a constant speed via a belt drive 5 having a pulley 6 which is mounted on the drive shaft 7 of a driving motor.

In order to obtain an initial startup or runup of the drum by means of the variable speed drive 4, a shiftable coupling 11 is attached to the drive shaft 10. By means of the coupling, the drum 1 can be coupled via the housing of the gearing 3 to the drive shaft 10. When the coupling is engaged during the startup or runup phase, the gearing 3 is blocked so that the screw conveyor 2 and the centrifuge drum 1 rotate together.

The feed or supply of the solids liquids mixture which is to be separated into its component is supplied through a line 12 having a valve control 13 with a rotary passage for flow control and such mechanism will be readily recognized by those versed in the art and need not be shown in detail.

A rotary passage feeds into the shaft 14 of the screw conveyor 2 into the separating chamber. Discharge lines 15 and 16 are provided for discharge of the solids and the liquid from the centrifuge drum.

A liquid or flocculent additive is supplied to the mixture to be separated via a line 17 which line has a control valving arrangment 18 therein.

The speed of the rotation of the centrifuge drum and the screw conveyor 2 are measured by impulse transmitters 19 and 20 which are operatively associated with the drive shafts 7 and 10 respectively. Impulse transmitters may be employed which are random generators and function contact-free being inductive. The impulse transmitters 19 and 20 are connected by instrument leads 21 and 22 to a computer unit 23.

The variable speed drive 4 is equipped with an impulse transmitter which measures the drive torque on the shaft 14 of the screw and this can be a piezo-electrical generator which detects the reaction movement of the drive bearing. The torque measuring transmitter 24 is connected by instrument leads 25 to the computer which is shown in its overall housing 26 indicated by dot-dash lines.

Smoothing or filter elements, measuring amplifiers and measured value transducers are disposed within the computer housing and are part of the equipment, but have not been illustrated in detail for clarity.

An actual value of the differential speed between the centrifugal drum 1 and the screw conveyor 2 is supplied to a comparison station 27 determined in the computer unit 23 from the signals supplied through the instrument leads 21 and 22.

Figure 2:
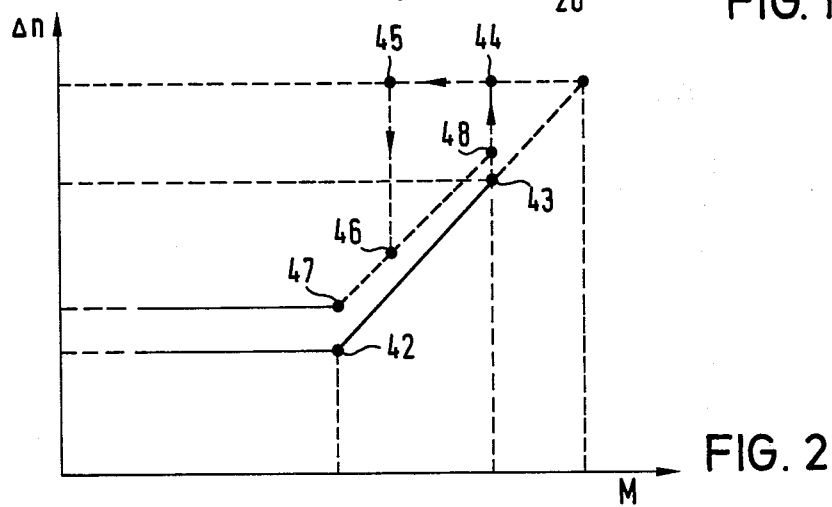
FIG. 2 is a graph illustrating the principles of change in operating relationship or characteristic which are effected automatically when a maximum or minimum value of each characteristic is reached.

The measured value for the driving torque for the screw conveyor which is supplied to the computer 26 via the leads 25 first arrives at a memory module 28 in which a particular characteristic or functional relationship which sets forth the rated dependency between the differential speed and screw torque is stored. In the drawing of FIG. 2, an example of such a characteristic or relationship is shown by the solid line 42, 43 or the dotted line 47, 48, and in simplified form this characteristic is shown in the graph as a straightline relationship.

The value of the differential speed corresponding to the measured value for screw torque now forms the rated value for the differential speed and is transmitted to the comparison station 27 whose output signal is the identified difference between the rated and actual value. Thus, in accordance with the method of the invention, the computer 26 is employed as a rated value generator for the differential speed. A voltage or current signal for the setting of a specific screw torque in order to compensate for this repetitive error is formed in the final control element 29 from the repetitive error determined in the comparison station 27.

The characteristic effected from the memory module 28 of the computer is shown as a straightline whose position in a coordinate system (FIG. 2) is defined by the function values of screw torque and differential speed. The characteristic is provided with maximum and minimum values and when the values of speed differential reach those maximum and minimum values, the speed differential changes as an increase or decrease until a predetermined value of torque is reached whereupon the mechanism automatically shifts to a new characteristic or functional relationship.

If, for example, the measured value of the screw torque exceeds the maximum value assigned to a specific characteristic, which is controlled by means of a limiting value generator 30, an appropriate signal arrives via a line 31 to a processor 32. The processor 32 changes the parameters identifying the characteristic at the maximum value and the characteristic itself is changed and is shifted in a step by step fashion to a new characteristic. For example, the new characteristic may be another parallel line such as indicated by the line 47, 48 in FIG. 2. Or, the characteristic instead of being shifted parallel to the first characteristic line 42, 43, may take a different slope or may have a different form. A control connection 33 provides for the transmission of control commands.

When the measured value of the screw torque reaches an upper maximum value of a characteristic which occurs due to an increased solid loads on the centrifuge, the processor 32 sets the maximum possible differential speed by means of the drive 4 via a control line 34 and a final control element 35 during an adjustable time interval. In this manner, the solid loads on the centrifuge is reduced in the shortest possible time, this resulting in a decrease in the screw torque. Simultaneously, the parameters of the characteristic are changed before a normal operation is again assumed adopting a new characteristic which is stored in the machine. Thus, the characteristic is changed step by step by the computer 26 until the operating point of the centrifuge, characterized by the function values of screw torque and differential speed resides within the range or within the maximum and minimum values of the characteristic. It is particularly advantageous, to obtain stable control conditions, to continue the change of the characteristic until the position of the operating point is approximately situated in the mean range of the characteristic. That is, the mechanism will operate most satisfactorily if normal operation is conducted halfway between the maximum and minimum torque and speed differential values of a given characteristic.

An instrument lead 36 connects the instrument lead 25 to a function module 37 which forms a value proportional to the change of the measured value of the screw torque relative to a predetermined reference value. This thus forms a signal indicative of tendency which is transmitted to the processor 32. The step-wise change of the characteristic, among other things, is undertaken as a function of this signal which relates to the tendency of the measured value of the screw torque. The further change of a characteristic executed by the processor 32 after every renewed reaching of a maximum or minimum value of a characteristic is set upon retention of the most recent input characteristic as soon as the operating point of the centrifuge identified by the screw torque and differential speed remains within the region bounded by the extreme value of the most recent characteristic. Simultaneously with, or in addition to a control operation over the change of the rated value of the differential speed, there is also the possibility of varying the amount of supplied solids liquid mixture flowing through a control line 38 and controlled by a control valve 39. This is also controlled by a final control valve 13. There is also the possibility of varying the amount of supplied liquid or flocculent additive via the control line 40 which has a control valve 41 and a final control element 18. By control of one or both of the mixture or flocculent, a finely graduated control possibility is attained.

The control operations by variation in the amount of supplied flocculent additive and supplied mixture can be employed advantageously for a fine setting of operation along the characteristic that is along the functional relationship curve of torque versus speed differential.

When the maximum value of screw torque is exceeded, an attenuation of control operation can be achieved by increasing the speed differential in specific graduations up to its possible maximum and the measured value of screw torque is determined at each stage. If a measurable reduction in screw torque occurs over a specific time interval during the dwell at one stage of differential, it is then unnecessary to change the drive 4 for obtaining maximum differential speed. By this arrangement, an unnecessary increase or running up of the screw drive does not occur, and the controlled operation is quantitatively limited. Finally, such a control augmented by a trend measurement can also be employed in the step-wise change of the supply of flocculent additive and/or solids liquid measure.

FIG. 2 provides an example of operation and shows the mechanism operating along a first characteristic represented by the solid line 42, 43. The line 42, 43 indicates the functional relationship between differential speed $\Delta n$ and screw torque M. The points 42 and 43 indicate maximum and minimum values allocated to the characteristic.

When torque increases due to change in consistency of the solids liquid mixture input or to other reasons, the torque will increase to the maximum point 43 of the characteristic 42, 43. The computer 26 will then move the differential speed upwardly along the dotted line from 43 to 44 so that a temporary working point at point 44 is reached. At this point, the change in torque is measured, and assuming the screw torque has dropped to a predetermined value shown at point 45, the differential speed is then reduced down dropping to a value indicated by point 46. When the reduced torque had been achieved at point 45, a new characteristic was determined, and this second new characteristic isrepresented by the line 47, 48 which is the new operating line along which the mechanism is controlled. This new current characteristic identified by the end points 47 and 48 has been shifted by displacement which is relatively parallel to the lines 42, 43, but it will be understood that the new characteristic may have taken a different shape or slope as determined by the control mechanism.

However, as the speed increased from point 43 to 44, if the torque had not dropped to the predetermined value 45, a new increment in speed would have been fed to the machine. At this increased speed differential, the torque would have again been measured until it reached point 45 and at that time, the speed would have been dropped down to operate along the line of the new characteristic. In the operation along the characteristic 47, 48, similar operation will occur, and if the torque reaches either of the maximum points 47 and 48, the speed will be dropped or increased and the choice of a new characteristic will automatically be supplied to the machine by the control mechanism.

Thus, it will be seen that we have provided an improved controlled centrifugal separator which attains the objectives and advantages above set forth.

We claim as our invention:

1. A method for controlling the differential speed between the relatively rotating centrifugal drum and the screw conveyor of a centrifugal separator comprising the steps:
measuring the driving torque of the screw;
measuring the speed of the drum and of the screw and obtaining a value of speed differential;
operating the drum and screw at a speed differential which constantly varies with variation in torque as a predetermined functional relationship to said torque;
making step by step changes in said relationship to obtain a relationship other than said first relationship at predetermined upward change or downward change of the values of the torque.

2. A method of controlling the differential speed between the relatively rotating centrifugal drum and screw conveyor of a centrifugal separator in accordance with the steps of claim 1:
wherein the differential speed is controlled in accordance with a predetermined linear relationship between the torque and differential.

3. A method of controlling the differential speed between the relatively rotating centrifugal drum and screw conveyor of a centrifugal separator in accordance with the steps of claim 1:
wherein the position of the relationship on a graphic representation on a coordinate system is changed by shifting of the relationship either by the change of its slope or by means of parallel displacement.

4. A method of controlling the differential speed between the relatively rotating centrifugal drum and screw conveyor of a centrifugal separator in accordance with the steps of claim 1:
wherein the maximum value of the differential speed is controlled by the computer until the torque has fallen below a predetermined value before setting of a new relationship.

5. A method of controlling the differential speed between the relatively rotating centrifugal drum and screw conveyor of a centrifugal separator in accordance with the steps of claim 1:
wherein when the upper limit value of the relationship is reached the differential speed is increased step by step and after each increase the change in screw torque is measured and a further change of differential speed is made as a function of change in screw torque.

6. A method of controlling the differential speed between the relatively rotating centrifugal drum and screw conveyor of a centrifugal separator in accordance with the steps of claim 1:
wherein the control of input to the separator is altered simultaneously with the change of relationship.

7. A method of controlling the differential speed between the relatively rotating centrifugal drum and the screw conveyor of a centrifugal separator comprising the steps:
measuring the driving torque of the screw;
measuring the speed of the drum and of the screw and obtaining a value of speed differential;
operating the drum and screw at a speed differential which varies constantly with torque during operation as a first predetermined functional relationship to the torque;
and changing said first relationship to a second functional relationship when said speed differential and torque reach a predetermined limit.

8. A method of controlling the differential speed between the relatively rotating centrifugal drum and the screw conveyor of a centrifugal separator comprising the steps:
measuring the driving torque of the screw;
measuring the speed of the drum and of the screw and obtaining a value of speed differential;
operating the drum and screw at a speed differential which constantly varies during operation as a first predetermined functional relationship to the torque;
and changing the speed differential independent of torque at a predetermined first torque limit and thereafter measuring torque and changing to a second functional relationship when a predetermined second torque less than first torque limit is reached.

9. A method of controlling the differential speed between the relatively rotating centrifugal drum and the screw conveyor of a centrifugal separator in accordance with the steps of claim 7:
and increasing the speed differential when a predetermined maximum torque is reached;
and then measuring said torque until said torque drops below a predetermined value and then establishing a new relationship between torque and speed differential.

10. A method of controlling the differential speed between the relatively rotating centrifugal drum and the screw conveyor of a centrifugal separator comprising the steps:
measuring the driving torque of the screw;
measuring the speed of the drum and of the screw and obtaining a value of speed differential;
operating the drum and screw at a speed differential which constantly varies during operation in a first predetermined functional relationship to the torque;
and changing the input amount of material supplied to the separator when the speed differential and torque reach a predetermined limit.

11. A method of controlling the differential speed between the relatively rotating centrifugal drum and the screw conveyor of a centrifugal separator in accordance with the steps of claim 10:
wherein the input amount of mixture being separated is changed.

12. A method of controlling the differential speed between the relatively rotating centrifugal drum and the screw conveyor of a centrifugal separator in accordance with the steps of claim 10:
wherein an amount of liquid being added is changed.

13. A centrifugal separator having a relatively rotating centrifugal drum and a screw conveyor comprising in combination:
means for measuring the driving torque for the screw;
means for measuring the speed of the drum and the screw and providing a value of speed differential;
means operating the drum and screw at a speed differential which constantly varies during operation as a first predetermined functional relationship to the torque;
said operating means increasing the speed differential independent of torque when the torque reaches a predetermined value and shifting to a new functional relationship between speed differential and torque when a new predetermined value of torque is reached.

14. A mechanism for controlling the differential speed between the relatively rotating centrifugal drum and screw conveyor of a centrifugal separator comprising in combination:

means driving the screw and measuring the driving torque thereof;

means driving the drum and screw and obtaining a value of speed differential;

a computer connected to the drive means and operating the drum and screw at a first speed differential which varies constantly during operation with variance of torque and which is a function of torque in accordance with a predetermined first functional relationship;

said computer increasing the differential independent of torque when a predetermined torque is reached;

and means thereafter changing said first relationship to a second functional relationship when the torque drops to a predetermined value.

* * * * *